United States Patent
Cui et al.

(10) Patent No.: US 10,305,642 B2
(45) Date of Patent: May 28, 2019

(54) METHOD, BASE STATION AND TERMINAL FOR DYNAMIC UPLINK CONFIGURATION IN WIRELESS COMMUNICATION SYSTEM

(71) Applicant: SONY CORPORATION, Tokyo (JP)

(72) Inventors: Qimei Cui, Beijing (CN); Mingliang Tao, Beijing (CN); Ting Fu, Beijing (CN)

(73) Assignee: SONY CORPORATION, Tokyo (JP)

( * ) Notice: Subject to any disclaimer, the term of this patent is extended or adjusted under 35 U.S.C. 154(b) by 358 days.

(21) Appl. No.: 14/903,141

(22) PCT Filed: Jul. 22, 2014

(86) PCT No.: PCT/CN2014/082678
§ 371 (c)(1),
(2) Date: Jan. 6, 2016

(87) PCT Pub. No.: WO2015/010595
PCT Pub. Date: Jan. 29, 2015

(65) Prior Publication Data
US 2016/0218838 A1 Jul. 28, 2016

(30) Foreign Application Priority Data

Jul. 25, 2013 (CN) .......................... 2013 1 0316687

(51) Int. Cl.
*H04L 1/18* (2006.01)
*H04W 72/12* (2009.01)
(Continued)

(52) U.S. Cl.
CPC ......... *H04L 1/1893* (2013.01); *H04B 7/2643* (2013.01); *H04B 7/2656* (2013.01);
(Continued)

(58) Field of Classification Search
None
See application file for complete search history.

(56) References Cited

U.S. PATENT DOCUMENTS 9,179,445 B2 * 11/2015 Wang .................... H04L 5/1469
9,521,669 B2 * 12/2016 Wang ................ H04W 72/0446
(Continued)

FOREIGN PATENT DOCUMENTS

| CN | 101222309 A | 7/2008 |
| CN | 101272175 A | 9/2008 |

(Continued)

*Primary Examiner* — Saba Tsegaye
(74) *Attorney, Agent, or Firm* — XSENSUS LLP

(57) ABSTRACT

A method, base station, and terminal for dynamic uplink configuration in a wireless communication system, the method including: determining reconfiguration information including a reconfiguration point of time, to employ first uplink and downlink subframe configuration in the first configuration period before the reconfiguration point of time, and to employ second uplink and downlink subframe configuration in a second configuration period after the reconfiguration point of time; and in the last transmission period before the reconfiguration point of time, employing an uplink scheduling timing sequence of a reference uplink and downlink subframe configuration according to an uplink data timing sequence, the reference uplink and downlink subframe configuration including the second uplink and downlink subframe configuration. The method, base station, and terminal efficiently achieve at least one of: ensuring resource utilization, addressing timing sequence conflicts, coordinating processes, ensuring user throughput, or reducing transmission delay during TDD uplink and downlink reconfiguration.

16 Claims, 13 Drawing Sheets

(51) Int. Cl.
*H04B 7/26* (2006.01)
*H04L 5/00* (2006.01)
*H04W 72/04* (2009.01)

(52) U.S. Cl.
CPC .............. *H04L 1/1822* (2013.01); *H04L 5/00* (2013.01); *H04W 72/1268* (2013.01); *H04W 72/0446* (2013.01)

(56) References Cited

U.S. PATENT DOCUMENTS

| | | | |
|---|---|---|---|
| 2010/0177669 A1 | 7/2010 | Suo et al. | |
| 2013/0083736 A1* | 4/2013 | Yin | H04W 72/0446 370/329 |
| 2013/0188533 A1* | 7/2013 | He | H04J 3/1605 370/280 |
| 2014/0293846 A1* | 10/2014 | Meng | H04L 5/1438 370/280 |
| 2014/0307591 A1* | 10/2014 | Wang | H04W 72/1231 370/278 |
| 2014/0362796 A1* | 12/2014 | Seo | H04L 1/1854 370/329 |

FOREIGN PATENT DOCUMENTS

| | | |
|---|---|---|
| CN | 102215060 A | 10/2011 |
| CN | 102404850 A | 4/2012 |

* cited by examiner

Figure 4 configuration #4

| 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|
| D | D | D | D | D | D | S | U | U | D | D | D | D | D | D | S | U | U | D | D | D | D | D | D | D |
|   |   |   |   |   |   |   | 0 |   |   |   |   |   |   |   |   |   | 0 |   |   |   |   |   |   |   |
|   |   |   |   |   |   |   |   | 1 |   |   |   |   |   |   |   |   |   | 1 |   |   |   |   |   |   |

Figure 5 configuration #5

| 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|
| D | D | D | D | D | D | S | U | D | D | D | D | D | D | D | S | U | D | D | D | D | D | D | D | D |
|   |   |   |   |   |   |   | 0 |   |   |   |   |   |   |   |   |   | 0 |   |   |   |   |   |   |   |

METHOD, BASE STATION AND TERMINAL FOR DYNAMIC UPLINK CONFIGURATION IN WIRELESS COMMUNICATION SYSTEM

FIELD

The present disclosure relates to the technology field of wireless communication, and in particular to a method, a base station and a communication terminal for performing a dynamic uplink configuration in a wireless communication system.

BACKGROUND

This section provides background information relating to the present disclosure, which is not necessarily prior art.

In a time division duplex (TDD) wireless communication system supported by the long term evolution (LTE) technology, 7 types of different non-symmetric uplink/downlink configurations can be provided. These uplink/downlink configurations may be provided downlink subframes of 40% to 90%, and have flexible service adaptability.

For the 7 types of uplink/downlink configurations, it is stipulated in the current standard the uplink/downlink hybrid automatic repeat request (HARQ) time sequence and uplink/downlink HARQ parallel process numbers for different configurations. In which, the uplink HARQ time sequence includes a schedule UL grant time sequence for the physical uplink shared channel (PUSCH) and a feedback physical hybrid repeat request indicator channel (PHICH) time sequence for the PUSCH, and the downlink HARQ time sequence includes feedback ACK/NACK time sequence for the physical downlink shared channel (PDSCH).

In the current TDD wireless communication system, in order to reduce interference between cells and decrease the management complexity, the same uplink/downlink configuration will be set statically for cells in the whole network. Under a homogeneous network, in case of covering using a macro base station, since the macro base station provides service for many users and the statistic law for the covered regions is smooth and consistent, the method of statically setting the same uplink/downlink configuration for the cells in the whole network is appropriate. However, under a heterogeneous network, a lot of low power access points are introduced, for example micro base stations, pico base stations, home base stations and remote radio units. Since the low power access points provide service for a few users, generally cover via hot spots, and uplink/downlink service amount of its covered regions changes dynamically and significantly, uplink/downlink service amounts between different low power access points are different significantly. In this case, adopting the above mentioned solution of the static and same configuration in the whole network will influence the improvement of the throughput of the heterogeneous network.

A dynamic TDD uplink/downlink configuration having flexible service self-adaptability may be conceived. As compared with the conventional static or semi-static TDD uplink/downlink configuration, in case of the dynamic TDD uplink/downlink configuration, appropriate uplink/downlink configuration is selected dynamically based on the service amount change condition by various cells, thereby the adaptability and the flexibility is stronger.

In the other aspect, since the uplink/downlink configuration used by each cell dynamically changes as the service amount of the cell changes, the same cell may use different uplink/downlink configurations in different time. The HARQ time sequence solution stipulated in the current standard may not be applicable for the case that the previous and next uplink/downlink configurations change.

SUMMARY

This section provides a general summary of the present disclosure, and is not a comprehensive disclosure of its full scope or all of its features.

An object of the present disclosure is to provide a method, a base station and a communication terminal for performing a dynamic uplink configuration in a wireless communication system, which can achieve at least one of the following effects: reducing transmission delay as much as possible, ensuring a user throughput, coordinating a process, solving a time sequence conflict and efficiently ensuring a resource utilization during a reconfiguration of the TDD uplink/downlink configuration.

According to an aspect of the present disclosure, there is provided a method for performing a dynamic uplink configuration in a wireless communication system including: determining reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and adopting, during a last transmission period before the reconfiguration point, for a time sequence of uplink data, an uplink scheduling time sequence of a reference uplink/downlink subframe configuration, wherein the reference uplink/downlink subframe configuration includes the second uplink/downlink subframe configuration.

According to another aspect of the present disclosure, there is provided a method for performing a dynamic uplink configuration in a wireless communication system including: determining reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and stopping transmission of uplink data during a last transmission period before the reconfiguration point.

According to another aspect of the present disclosure, there is provided a communication device including: a determining unit configured to determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and a dynamic uplink configuration unit configured to perform a dynamic uplink configuration based on the reconfiguration information, so that during a last transmission period before the reconfiguration point, for a time sequence of uplink data, an uplink scheduling time sequence of a reference uplink/downlink subframe configuration is adopted, and wherein the reference uplink/downlink subframe configuration includes the second uplink/downlink subframe configuration.

According to another aspect of the present disclosure, there is provided a communication device including: a determining unit configured to determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and a dynamic uplink configuration unit configured to perform a dynamic uplink configuration based on the reconfiguration information, so that transmission of uplink data is stopped during a last transmission period before the reconfiguration point.

According to another aspect of the present disclosure, there is provided a communication device including: a determining unit configured to determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and a scheduling control unit configured to perform scheduling control on an uplink HARQ process during a predetermined period of time before the reconfiguration point, so that only the uplink HARQ process existing in the second uplink/downlink subframe configuration is remained during a last transmission period before the reconfiguration point.

According to another aspect of the present disclosure, there is provided a base station including: the communication device according to the present disclosure; and a transmitting unit configured to send a signaling to a communication terminal to inform the communication terminal of reconfiguration information.

According to another aspect of the present disclosure, there is provided a communication terminal including: the communication device according to the present disclosure; a receiving unit configured to receive a signaling sent by a base station to obtain reconfiguration information for determination by the determining unit included in the communication device, and receive uplink scheduling information or feedback information transmitted by the base station based on the dynamic uplink configuration; a processing unit configured to decode the uplink scheduling information or feedback information based on the dynamic uplink configuration; and a transmitting unit configured to send uplink data to the base station based on the dynamic uplink configuration and a decoding result from the processing unit.

According to another aspect of the present disclosure, there is provided a program product including machine readable instruction codes stored therein, wherein the machine readable instruction codes, when being read or executed by a computer, can enable the computer to perform the method for performing a dynamic uplink configuration in a wireless communication system according to the present disclosure.

According to another aspect of the present disclosure, there is provided a machine readable storage medium, on which the program product according to the present disclosure is carried.

With the method, the base station and the communication terminal for performing a dynamic uplink configuration in a wireless communication system according to the present disclosure, during a last transmission period before the reconfiguration point, an uplink scheduling time sequence of a new period configuration is adopted for a time sequence of uplink data, thereby achieving flexible service self-adaptability for the dynamic uplink/downlink configuration in a cell, while ensuring the user throughput, and reducing the transmission time delay.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings:

FIG. 2 shows a schematic diagram of an uplink HARQ process of a configuration #1;

FIG. 3 shows a schematic diagram of an uplink HARQ process of a configuration #2;

FIG. 4 shows a schematic diagram of an uplink HARQ process of a configuration #3;

FIG. 5 shows a schematic diagram of an uplink HARQ process of a configuration #4;

FIG. 6 shows a schematic diagram of an uplink HARQ process of a configuration #5;

FIG. 11 shows a schematic diagram of process scheduling control for a configuration #6;

Figure 1:
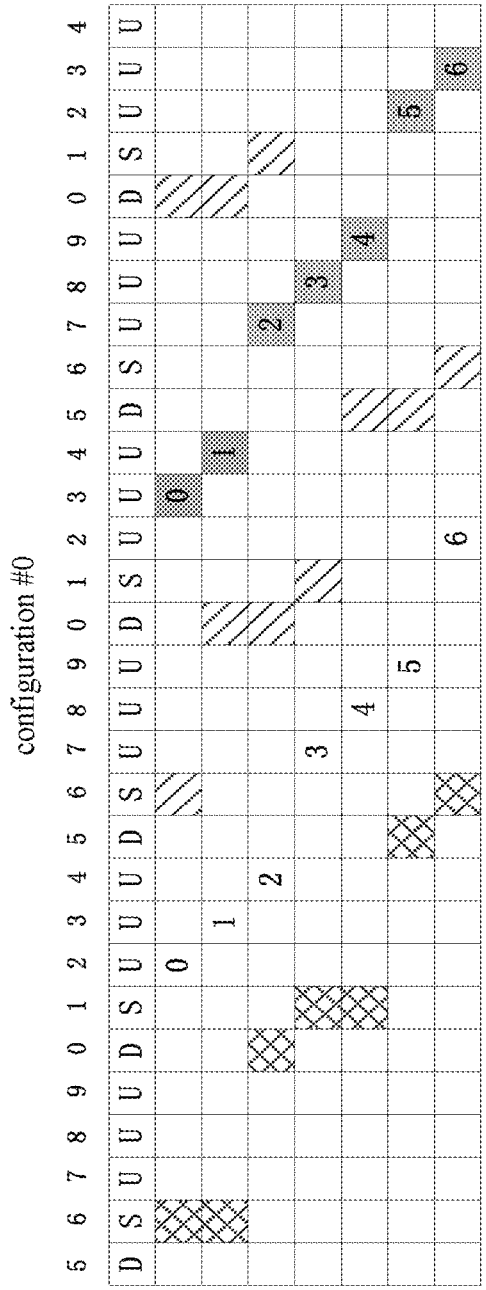
FIG. 1 shows a schematic diagram of an uplink HARQ process of a configuration #0.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

An uplink HARQ rule in the current standard is described firstly.

Since an uplink data shared channel for a user equipment (UE) needs to be scheduled by a base station, an uplink HARQ time sequence includes a scheduling UL grant time sequence for the PUSCH and a feedback PHICH time sequence for the PUSCH.

When the UE needs to send new data, the UE will send a scheduling request (SR) to the base station via the PUCCH. The base station receives the scheduling request and sends a downlink control information (DCI) 0/4 uplink scheduling signaling to the UE via the PDCCH.

When the UL grant signaling in the PDCCH is received by the UE in a subframe n, uplink data will be sent in a subframe (n+k). k is obtained by looking up the following table 1.

TABLE 1 values of k for TDD configuration #0 to #6

| TDD UL/DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | | 4 | |
| 6 | 7 | 7 | | | | 7 | 7 | | | 5 |

Particularly, if an uplink/downlink configuration of a system is a configuration #0, and since the number of uplink subframes is greater than the number of downlink subframes in the configuration #0, multiple uplink subframes need to be scheduled in PDCCHs of certain downlink subframes, which depends on a UL INDEX value in the DCI 0/4.

If an upper bit of the UL INDEX in the DCI 0/4 is set as 1, a value of k is looked up in table 1;

If a lower bit of the UL INDEX in the DCI 0/4 is set as 1, k=7; and

If the upper bit and the lower bit of the UL INDEX in the DCI 0/4 each are set as 1, data needs to be transmitted in both subframe (n+k) and subframe (n+7), and the value of k is looked up in table 1.

The scheduling UL grant time sequence for the uplink PUSCH is described above. Next a feedback PHICH time sequence for the uplink PUSCH is described.

When the base station receives uplink data sent from the UE, the base station will feed back an ACK/NACK signaling in a PHICH channel for a respective downlink subframe.

When the base station receives the data in a subframe n, the base station will send feedback information in a subframe (n+$k_{PHICH}$). A value of $k_{PHICH}$ is obtained by looking up the following table 2. Particularly, if an uplink/downlink configuration of the system is a configuration #0, data for two uplink PUSCHs will be fed back in a subframe 0 and a subframe 5.

TABLE 2 values of $k_{PHICH}$ for TDD configurations #0 to #6

| TDD UL/DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

For a TDD LTE system, different uplink/downlink configurations support different maximum numbers of uplink HARQ processes, which may be referred to table 3.

TABLE 3 the number of synchronous uplink HARQ processes for the TDD

| TDD UL/DL configuration | the number of HARQ processes for a conventional HARQ operation |
|---|---|
| 0 | 7 |
| 1 | 4 |
| 2 | 2 |
| 3 | 3 |
| 4 | 2 |
| 5 | 1 |
| 6 | 6 |

In the LTE system, a synchronous HARQ mechanism is adopted for uplink, i.e., there is a mapping relation between process numbers and subframe numbers. From the configuration #1 to the configuration #5 in the uplink/downlink configuration, the correspondence between process numbers and subframe numbers is predetermined, i.e., data for a respective process is transmitted fixedly in subframes of each frame period. A round-trip time (RTT) period between the configuration #0 and the configuration #6 is 11, i.e., the correspondence between process numbers and subframe numbers is not predetermined, but the same number of uplink subframes are located between data corresponding to the same process number.

FIG. 1 shows an uplink HARQ process of a configuration #0. In FIG. 1, a letter "D" represents a downlink subframe, a letter "S" represents a special subframe, and a letter "U" represents an uplink subframe. As shown in FIG. 1, the correspondence between process numbers and subframe numbers is not predetermined in the uplink HARQ process of the configuration #0, but the same number (6) of uplink subframes are located between data corresponding to the same process number. In the present disclosure, an interval between data transmit the same process number according to the uplink/downlink subframe configuration in one configuration period is referred to as a transmission period. Apparently, in the uplink HARQ process of the configuration #0, the transmission period is greater than the frame period.

Figures 2, 3, 4:
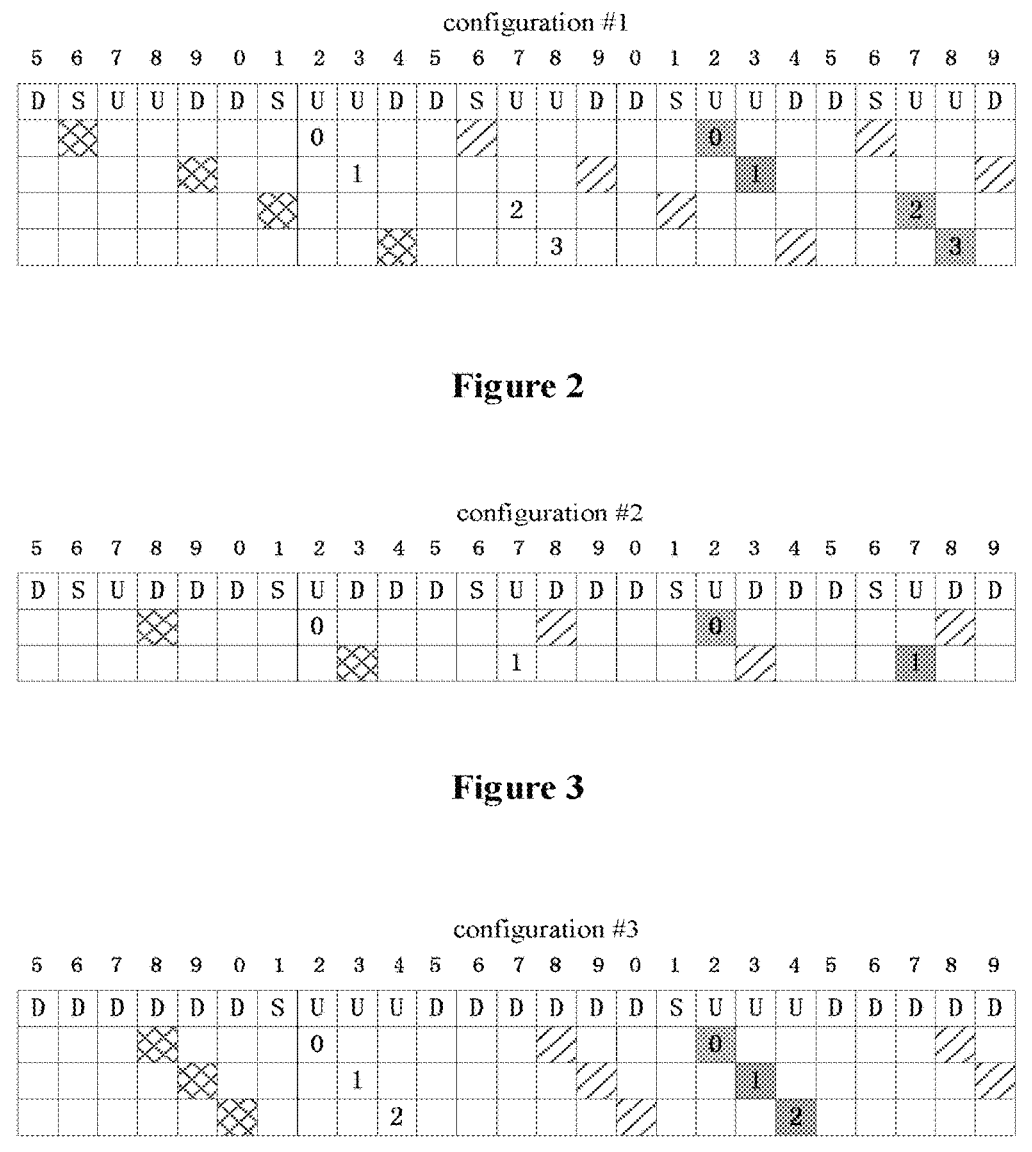

As shown in FIG. 2, in an uplink HARQ process of a configuration #1, a process 0 is transmitted in an uplink subframe 2, a process 1 is transmitted in an uplink subframe 3, a process 2 is transmitted in an uplink subframe 7, and a process 3 is transmitted in an uplink subframe 8. In this case, the transmission period is equal to the frame period.

As shown in FIG. 3, in an uplink HARQ process of a configuration #2, the process 0 is transmitted in the uplink subframe 2, and the process 1 is transmitted in the uplink subframe 7. In this case, the transmission period is equal to the frame period.

As shown in FIG. 4, in an uplink HARQ process of a configuration #3, the process 0 is transmitted in the uplink subframe 2, the process 1 is transmitted in the uplink subframe 3, and the process 2 is transmitted in the uplink subframe 4. In this case, the transmission period is equal to the frame period.

As shown in FIG. 5, in an uplink HARQ process of a configuration #4, the process 0 is transmitted in the uplink subframe 2, and the process 1 is transmitted in the uplink subframe 3. In this case, the transmission period is equal to the frame period.

As shown in FIG. 6, in an uplink HARQ process of a configuration #5, the process 0 is transmitted in the uplink subframe 2. In this case, the transmission period is equal to the frame period.

Figure 7:
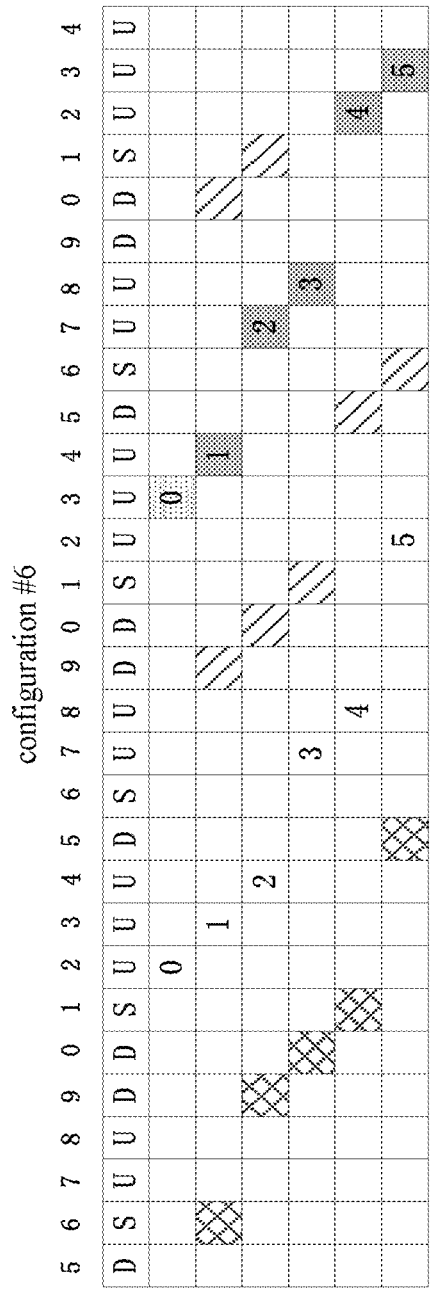
FIG. 7 shows a schematic diagram of an uplink HARQ process of a configuration #6.

As shown in FIG. 7, in an uplink HARQ process of a configuration #6, the correspondence between process numbers and subframe numbers is not predetermined, but the same number (5) of uplink subframes are located between data corresponding to the same process number. In this case, the transmission period is greater than the frame period.

For different uplink/downlink configurations, scheduling and feedback time sequences for an uplink HARQ are different; and a synchronous HARQ time sequence is adopted for uplink, of which scheduling and feedback subframes are predetermined. When the UE receives the UL grant instruction in a certain subframe, a subsequent subframe in which data is sent or retransmission is performed is determined. Similarly, after the UE sends data, a feedback signal for data and retransmission scheduling will be received in a determined subframe (the base station generally will place the feedback signal and the retransmission scheduling in the PDCCH of the same subframe).

If the uplink/downlink configuration is changed, time sequences also change; hence uplink subframes after a reconfiguration point can not be utilized due to receiving no uplink scheduling information, while feedback information for data before the reconfiguration point can not be obtained correctly. In the present disclosure, the reconfiguration point refers to a point-in-time when the uplink/downlink subframe configuration changes from an uplink/downlink subframe configuration of a previous configuration period to an uplink/downlink subframe configuration of a next configuration period.

In addition, if the uplink/downlink configuration is changed, feedback or retransmission which is not completed before the reconfiguration point needs to be transmitted continuously in processes of the next configuration period. Since the maximum number of HARQ processes are different for different configurations and if the maximum number of HARQ processes of a new period is greater than that of the original period, an error occurs due to that processes with a process number greater than the maximum number of HARQ processes of the new period can not be transmitted correctly in the original period. For example, if the uplink/downlink configuration changes from the configuration #0 to the configuration #3, and since the configuration #3 can provide three uplink process number identities at most but there are 7 uplink processes in the configuration #0, a problem for process number mapping occurs.

With the shortening of the uplink/downlink reconfiguration period, a possibility that the above conflict occurs in the system increases, and the HARQ performance reduction of the user is increasingly obvious. Hence, in the TDD-LTE dynamic uplink/downlink configuration system, the HARQ time sequence solution and the process number mapping solution need to be reconsidered to ensure throughput of the user.

In view of the above analysis, a solution for coordinating an uplink HARQ time sequence and process in a TDD-LTE dynamic uplink/downlink configuration system is put forward by the inventor of the present disclosure. The solution is a solution for processing an uplink HARQ time sequence and process of a legacy UE and an R12 UE in a longer reconfiguration period of the TDD UL/DL configuration, which can achieve at least one of the following effects: reducing transmission delay as much as possible, ensuring a user throughput, coordinating a process, solving a time sequence conflict and efficiently ensuring a resource utilization during a reconfiguration of the TDD UL/DL configuration.

Figure 8:
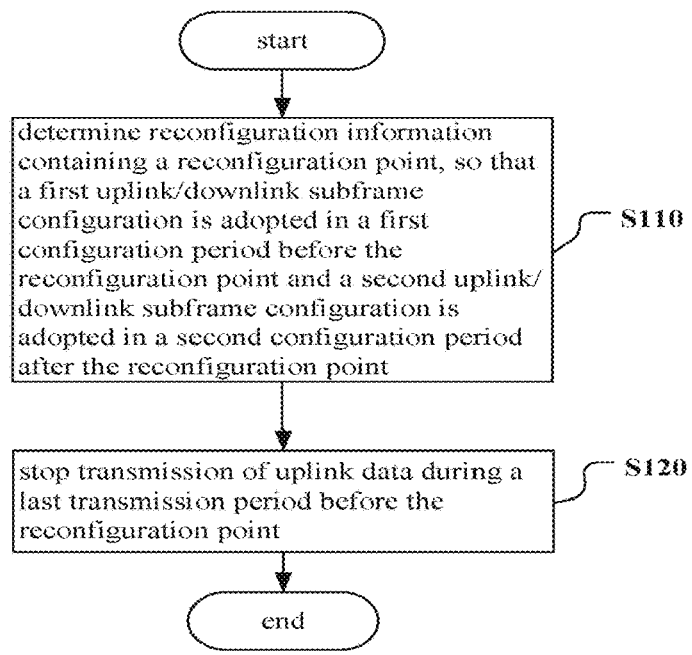
FIG. 8 shows a flowchart of a method for performing a dynamic uplink configuration in a wireless system according to an embodiment of the present disclosure.

FIG. 8 shows a method for performing a dynamic uplink configuration in a wireless communication system according to an embodiment of the present disclosure.

As shown in FIG. 8, in step S110, reconfiguration information containing a reconfiguration point is determined, so that a first uplink/downlink subframe configuration is adopted in a first configuration period before the reconfiguration point and a second uplink/downlink subframe configuration is adopted in a second configuration period after the reconfiguration point.

In the present disclosure, the reconfiguration information may further include a reconfiguration period and an uplink/downlink configuration and so on other than the reconfiguration point, which will be described in detail hereinafter.

Subsequently, in step S120, transmission of uplink data is stopped during a last transmission period before the reconfiguration point.

The uplink data here may include at least one of uplink control information which is reported aperiodically and an uplink HARQ.

For an uplink HARQ process, during a last transmission period of a previous period, no new data transmission is started in the uplink HARQ process, data retransmission is not started either, and processes of the previous period are taken as new data to be retransmitted in a new period.

Since transmission of uplink data is stopped during the last transmission period before the reconfiguration point, no uplink HARQ time sequence conflict occurs. The method as shown in FIG. 8 may be applicable for both dynamic uplink configurations of the legacy UE and the R12 UE.

Figure 9:
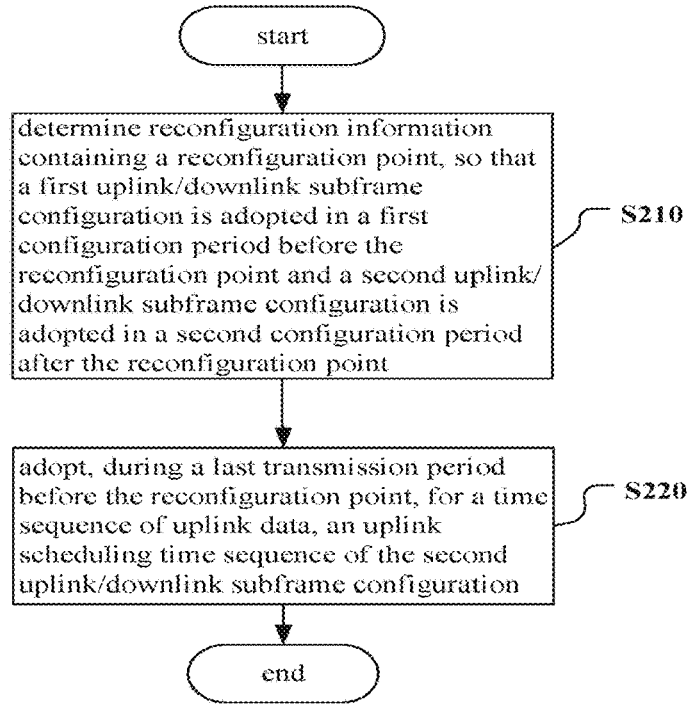
FIG. 9 shows a flowchart of a method for performing a dynamic uplink configuration in a wireless communication system according to another embodiment of the present disclosure.

FIG. 9 shows a method for performing a dynamic uplink configuration in a wireless communication system according to another embodiment of the present disclosure.

As shown in FIG. 9, in step S210, reconfiguration information containing a reconfiguration point is determined, such that a first uplink/downlink subframe configuration is adopted in a first configuration period before the reconfiguration point and a second uplink/downlink subframe configuration is adopted in a second configuration period after the reconfiguration point.

Subsequently, in step S220, during a last transmission period before the reconfiguration point, an uplink scheduling time sequence of the second uplink/downlink subframe configuration is adopted for a time sequence of uplink data.

The uplink data here may also include at least one of uplink control information which is reported aperiodically and an uplink HARQ.

The method as shown in FIG. 9 is only applicable for the dynamic uplink configuration of the R12 UE.

For the uplink HARQ process, the dynamic TDD system may be classified into the following three cases based on the maximum number of uplink HARQ processes of the uplink/downlink subframe configuration of configuration periods before and after the reconfiguration point.

First case: a set of uplink subframes contained in a configuration of a previous period (i.e., a first configuration period) is a subset of a set of uplink subframes of a new configuration (i.e., the new configuration includes all the uplink subframes of the previous period configuration, and an extra uplink subframe not contained in the previous period configuration is included in the new configuration. In other words, a set of downlink subframes of the previous period configuration is a superset of a set of downlink subframes of the new configuration).

Second case: the set of uplink subframes contained in the configuration of the previous period is a superset of the set of uplink subframes of the new configuration (i.e., the configuration of the previous period includes all the uplink subframes of the new configuration and an extra uplink subframe not contained in the new configuration is included in the configuration of the previous period. In other words, the set of downlink subframes of the configuration of the previous period is a subset of the set of downlink subframes of the new configuration).

Third case: the set of uplink subframes contained in the configuration of the previous period is neither a superset nor a subset of the set of uplink subframes of the new configuration.

A classification table for all the reconfiguration cases may be obtained based on the above classification, as shown in table 4. In table 4, a number "1" represents the first case, a number "2" represents the second case, and a number "3" represents the third case.

TABLE 4 classification for different subframe reconfiguration cases

|  |  | new period configuration | | | | | | |
|---|---|---|---|---|---|---|---|---|
|  |  | #0 | #1 | #2 | #3 | #4 | #5 | #6 |
| previous | #0 |  | 1 | 1 | 1 | 1 | 1 | 1 |
| period | #1 | 2 |  | 1 | 3 | 1 | 1 | 2 |
|  | #2 | 2 | 2 |  | 3 | 3 | 1 | 2 |
|  | #3 | 2 | 3 | 3 |  | 1 | 1 | 2 |
|  | #4 | 2 | 2 | 3 | 2 |  | 1 | 2 |
|  | #5 | 2 | 2 | 2 | 2 | 2 |  | 2 |
|  | #6 | 2 | 1 | 1 | 1 | 1 | 1 |  |

For the first case, an uplink scheduling and feedback and retransmission time sequence of the new period configuration is adopted during the last transmission period of the previous period, such that feedback for uplink HARQ processes of the previous period is performed smoothly in a predetermined downlink subframes of the new period, while the newly increased uplink HARQ processes in the new period may be scheduled in advance.

For the second case, process scheduling control may be performed firstly, such that only the uplink HARQ process existing in the new periodic configuration is remained during the last transmission period of the previous period.

Specifically, a starting point-in-time for scheduling control may be set in a first configuration period (the previous period) before the reconfiguration point, to perform scheduling control on an uplink HARQ process in a period of time between the starting point-in-time for scheduling control and the reconfiguration point, such that only the uplink HARQ process existing in the second uplink/downlink subframe configuration (the new period configuration) is remained during the last transmission period before the reconfiguration point.

The purpose of setting the starting point-in-time is to perform scheduling control before the reconfiguration point.

One starting point-in-time may be selected based on a channel condition. The better the channel condition is, the smaller the probability that data is retransmitted is, and the closer the starting point-in-time to be selected is from the reconfiguration point. A latest starting point-in-time to ensure that only the uplink HARQ processes existing in the second uplink/downlink subframe configuration are remained during the last transmission period before the reconfiguration point equals to three times of the maximum RTT time. In other words, the period of time between the starting point-in-time and the reconfiguration point may be no less than three times of the maximum RTT time. If the period of time between the starting point-in-time for scheduling control and the reconfiguration point is greater than three times of the maximum RTT time, it can be ensured that at any channel condition, only the uplink HARQ processes existing in the second uplink/downlink subframe configuration are remained during the last transmission period before the reconfiguration point. However, in case of a good channel condition, the period of time between the starting point-in-time and the reconfiguration point may be less than three times of the maximum RTT time. In this case, the process numbers may be inconsistent, however, with a little probability. If the process numbers conflict, the process may be interrupted and retransmitted. In addition, the closer the starting point-in-time for scheduling control is from the reconfiguration point, the higher the resource utilization is.

During the period of time between the starting point-in-time for scheduling control and the reconfiguration point, new data may be transmitted only in the remained uplink HARQ processes; and if the remained uplink HARQ processes have been occupied, no new data is scheduled for transmission.

For the remained uplink HARQ processes, during the last transmission period before the reconfiguration point, if a feedback operation for the uplink HARQ process is performed before the reconfiguration point, a feedback time sequence of the first uplink/downlink subframe configuration (the previous period configuration) may be adopted.

Furthermore, for the remained uplink HARQ processes, during the last transmission period before the reconfiguration point, if a feedback and retransmission operation for the uplink HARQ process is performed after the reconfiguration point, a feedback and retransmission time sequence of the second uplink/downlink subframe configuration (the new period configuration) may be adopted.

Therefore, for the remained uplink HARQ processes, during the last transmission period before the reconfiguration point, if an NACK feedback for the uplink HARQ process is performed before the reconfiguration point and a retransmission operation for the uplink HARQ process is performed after the reconfiguration point, and no uplink scheduling time sequence exists in the second uplink/downlink subframe configuration (the new period configuration) for a downlink subframe for which the NACK feedback is performed, one uplink scheduling for the downlink subframe may be redefined in the second uplink/downlink subframe configuration to schedule the retransmitted uplink HARQ process into an uplink subframe of the second uplink/downlink subframe configuration (the new period configuration). Of course, if for the downlink subframe for which the NACK feedback is performed, an uplink scheduling time sequence exists in the second uplink/downlink subframe configuration (the new period configuration), scheduling is performed based on the uplink scheduling time sequence of the second uplink/downlink subframe configuration (the new periodic configuration).

The following table 5 lists all the cases in which UL grant needs to be redefined for the second case.

TABLE 5 all the cases in which UL grant needs to be redefined for the second case

| configuration case (previous period/new period) | newly increased scheduling instruction (downlink PDCCH/uplink scheduling subframe) |
| --- | --- |
| configuration #0/configuration #2 | downlink subframe 6/uplink subframe 2 |
| configuration #0/configuration #3 | downlink subframe 6/uplink subframe 2 |
| configuration #0/configuration #4 | downlink subframe 6/uplink subframe 2 |
| configuration #0/configuration #5 | downlink subframe 6/uplink subframe 2 |
| configuration #0/configuration #6 | downlink subframe 6/uplink subframe 3 |
| configuration #1/configuration #2 | downlink subframe 6/uplink subframe 2 |
| configuration #1/configuration #4 | downlink subframe 6/uplink subframe 2 |
| configuration #1/configuration #5 | downlink subframe 6/uplink subframe 2 |
| configuration #2/configuration #5 | downlink subframe 6/uplink subframe 2 |
| configuration #6/configuration #2 | downlink subframe 6/uplink subframe 2 |
| configuration #6/configuration #3 | downlink subframe 6/uplink subframe 2 |
| configuration #6/configuration #4 | downlink subframe 6/uplink subframe 2 |
| configuration #6/configuration #5 | downlink subframe 6/uplink subframe 2 |

For the third case, since positions of uplink subframes of the previous period configuration and the next period configuration are different, process scheduling control needs to be performed firstly, such that only an intersection of uplink HARQ processes of the previous period configuration and the next period configuration is remained during the last transmission period of the pervious period. After the scheduling control is completed, the third case changes to the second case, and subsequently it may be processed using the processing method for the second case.

The following table 6 lists all the cases in which UL grant needs to be redefined for the third case.

TABLE 6 all the cases in which UL grant needs to be redefined for the third case

| configuration case (previous period/new period) | newly increased scheduling instruction (downlink PDCCH/uplink scheduling subframe) |
| --- | --- |
| configuration #1/configuration #3 | downlink subframe 6/uplink subframe 2 |
| configuration #3/configuration #1 | downlink subframe 8/uplink subframe 2 |

Hereinafter uplink HARQ process processing solutions for the three uplink cases of the R12 UE in the uplink HARQ process processing as shown in FIG. 9 are illustrated by specific examples.

For the first case, it is assumed that a configuration #1 is adopted in the previous period and a configuration #0 is adopted in a new period. The configuration #1 includes four uplink subframes, the configuration #0 includes seven uplink subframes, and a set of uplink subframes contained in the configuration #1 is a subset of a set of uplink subframes contained in the configuration #0.

Figure 10:
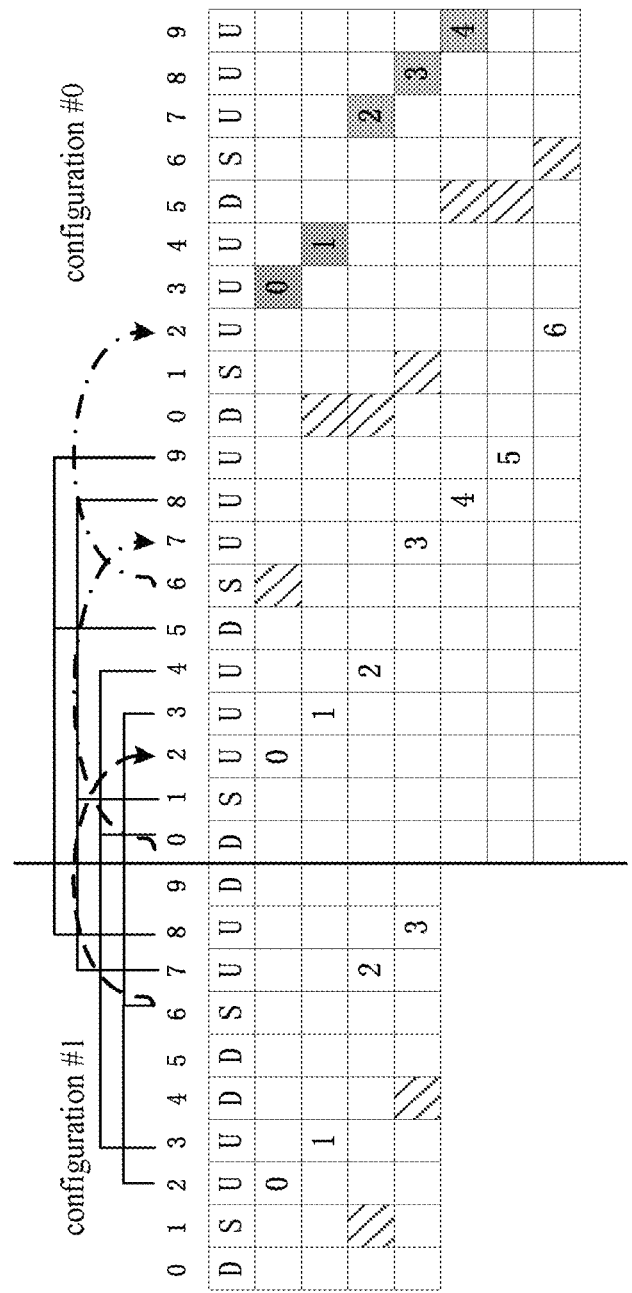
FIG. 10 shows a schematic diagram of a dynamic uplink configuration when an uplink/downlink subframe configuration changes from a configuration #1 to a configuration #0.

As shown in FIG. 10, it is assumed that in the worse case, all the processes each need to be retransmitted. Due to the special condition in the configuration #0 that one downlink subframe may bear the scheduling of two uplink resources (depending on a format of DCI 0), the base station needs to select reasonably to ensure a one-to-one mapping relationship for the uplink subframes. Dotted lines and chain lines in FIG. 10 represent newly-scheduled uplink processes, wherein the dotted lines represent cross-period scheduling. With this solution, no new time sequence is defined and it is ensured that the uplink resource is utilized efficiently.

For the first case, during the last transmission period before the reconfiguration point, an uplink scheduling time sequence and a feedback and retransmission time sequence of the configuration #0 are adopted. Specifically, feedback for a process 0 of an uplink subframe 2 is performed and retransmission is scheduled in a downlink subframe 6, then the process 0 is retransmitted in an uplink subframe 3 of the new period and becomes a process 1 in the new period.

Further, feedback for the process 1 of the uplink subframe 3 is performed and retransmission is scheduled in a downlink subframe 0 of the new period, then the process 1 is retransmitted in an uplink subframe 4 of the new period and becomes a process 2 in the new period.

Further, feedback for the process 2 of an uplink subframe 7 is performed and retransmission is scheduled in a downlink subframe 1 of the new period, then the process 2 is retransmitted in an uplink subframe 8 of the new period and becomes a process 4 in the new period.

Further, feedback for a process 3 of the uplink subframe 8 is performed and retransmission is scheduled in a downlink subframe 5 of the new period, then the process 3 is retransmitted in an uplink subframe 9 of the new period and becomes a process 5 in the new period.

Then, the process 0 in the new period is transmitted in the uplink subframe 2, and scheduling for the process 0 may be performed in the downlink subframe 6 of the previous period, as shown by the dotted lines in FIG. 10.

Then, the process 3 in the new period is transmitted in the uplink subframe 7, and scheduling for the process 3 may be performed in the downlink subframe 0 of the new period, as shown by the chain lines in FIG. 10.

Finally, a process 6 in the new period is transmitted in the uplink subframe 2, and scheduling for the process 6 may be performed in the downlink subframe 6 of the new period, as shown by the chain lines in FIG. 10.

For the second case, it is assumed that a configuration #6 is adopted in the previous period and a configuration #1 is adopted in the new period. The configuration #6 includes six uplink subframes, the configuration #1 includes four uplink subframes, and a set of uplink subframes contained in the configuration #6 is a superset of a set of uplink subframes contained in the configuration #1.

Figure 11:
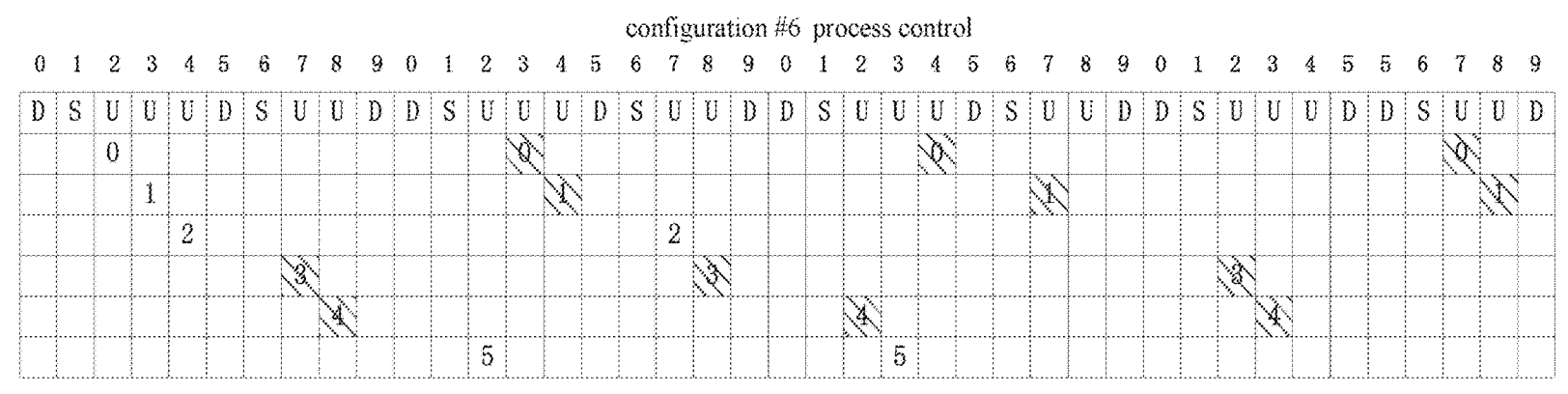

As shown in FIG. 11, scheduling control is performed on processes of the configuration #6 firstly. Since the processes of the configuration #1 are transmitted in uplink subframes 2, 3, 7 and 8, only processes 0, 1, 3 and 4 are remained for the configuration #6. In FIG. 11, a period of time between the starting point-in-time and the reconfiguration point is equal to three times of RTT time, and data in other processes is retransmitted twice at most.

Figure 12:
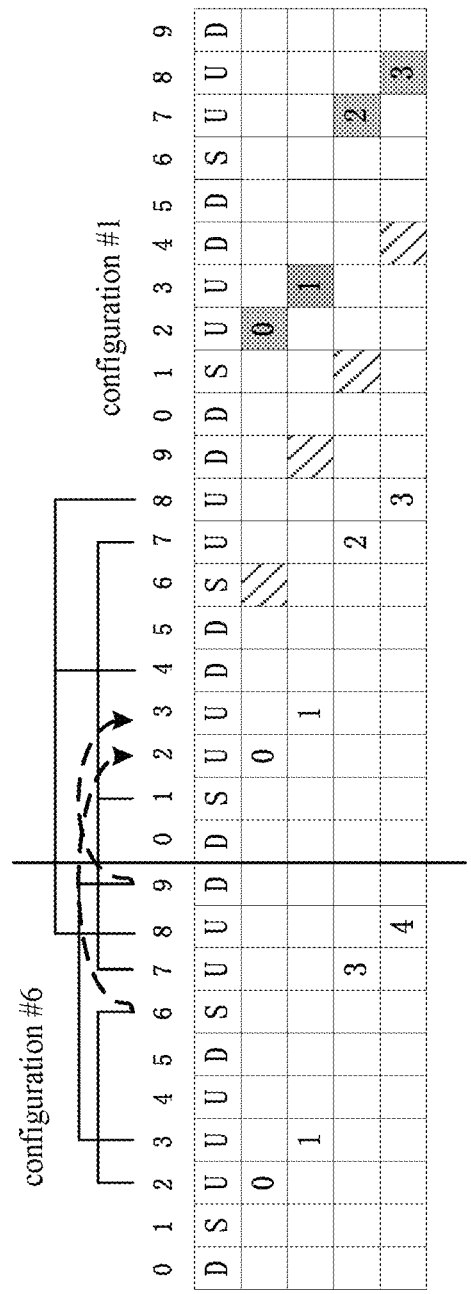
FIG. 12 shows a schematic diagram of a dynamic uplink configuration when an uplink/downlink subframe configuration changes from a configuration #6 to a configuration #1.

After the process scheduling control ends, a feedback and retransmission time sequence for the process is performed. As shown in FIG. 12, dotted lines represent uplink subframe scheduling performed before the reconfiguration point. In this case, preferably it is scheduled based on the uplink scheduling mapping defined in the configuration #1. Here the subframes 6 and 9 each are defined in the configuration #1, hence it may be scheduled directly based on the configuration #1.

Specifically, feedback for the process 0 of the uplink subframe 2 is performed and retransmission is scheduled in a downlink subframe 6, then the process 0 is retransmitted in an uplink subframe 2 of the new period and becomes a process 0 in the new period.

Further, feedback for the process 1 of the uplink subframe 3 is performed and retransmission is scheduled in a downlink subframe 9, then the process 1 is retransmitted in the uplink subframe 3 of the new period and becomes a process 1 in the new period.

Further, feedback for the process 3 of the uplink subframe 7 is performed and retransmission is scheduled in a downlink subframe 1 of the new period, then the process 3 is retransmitted in an uplink subframe 7 of the new period and becomes a process 2 in the new period.

Finally, feedback for the process 4 of the uplink subframe 8 is performed and retransmission is scheduled in a downlink subframe 4 of the new period, then the process 4 is retransmitted in the uplink subframe 8 of the new period and becomes a process 3 in the new period.

For the third case, it is assumed that a configuration #1 is adopted in the previous period and a configuration #3 is adopted in the new period. The configuration #1 includes four uplink subframes, the configuration #3 includes three uplink subframes, and a set of uplink subframes contained in the configuration #1 is neither a superset nor a subset of a set of uplink subframes contained in the configuration #3.

Figure 13:
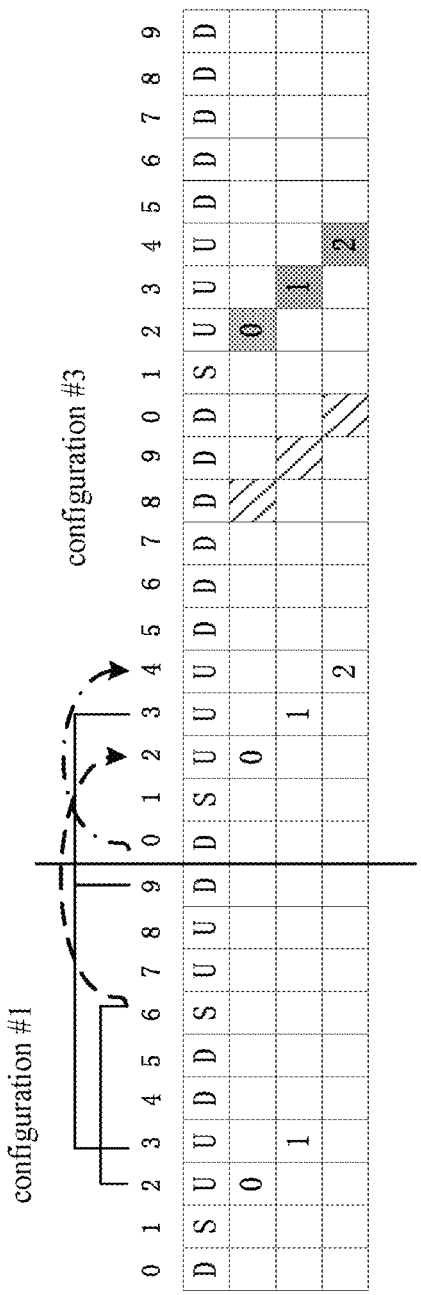
FIG. 13 shows a schematic diagram of a dynamic uplink configuration when an uplink/downlink subframe configuration changes from a configuration #1 to a configuration #3.

Firstly, scheduling control is performed on uplink processes of the configuration #1, only processes of the subframes 2 and 3 are remained, then time sequence scheduling is performed using the same method as that in the second case. As shown in FIG. 13, a dotted line represents uplink scheduling performed before the reconfiguration point. Since no scheduling time sequence for the downlink subframe 6 is defined in the configuration #3, an uplink scheduling time sequence needs to be redefined: 6→2. A chain line represents uplink scheduling performed on a new process.

Specifically, feedback for the process 0 of the uplink subframe 2 is performed and retransmission is scheduled in the downlink subframe 6. In this case, since no scheduling time sequence is defined in the downlink subframe 6 of the configuration #3, it is defined that the process 0 is retransmitted in the uplink subframe 2 of the new period and becomes a process 0 in the new period.

Further, feedback for the process 1 of the uplink subframe 3 is performed and retransmission is scheduled in the downlink subframe 9, then the process 1 is retransmitted in the uplink subframe 3 of the new period and becomes a process 1 in the new period.

Finally, the process 2 in the new period is transmitted in the uplink subframe 4, and scheduling for the process 2 may be performed in a downlink subframe 0 of the new period.

The method for performing a dynamic uplink configuration in a wireless communication system according to the embodiments of the present disclosure are described above by taking the uplink HARQ process as uplink data example. It should be noted that, the uplink data may include not only the uplink HARQ process but also the uplink control information. In addition, the uplink HARQ process processing solutions for the first case, the second case and the third case according to the present disclosure are described above respectively. The HARQ process processing solution according to the present disclosure may be used for only one of the three cases, any two cases of the three cases or all the three cases, which is not limited in the present disclosure.

In addition, it should be noted that, it may be operated by taking the reconfiguration point as a boundary without considering a relationship between a set of uplink subframes contained in the first uplink/downlink subframe configuration and a set of uplink subframes contained in the second uplink/downlink subframe configuration. In this case, scheduling control may be performed on the uplink HARQ process during a predetermined period of time before the reconfiguration point, such that only the uplink HARQ processes existing in the second uplink/downlink subframe configuration are remained during the last transmission period before the reconfiguration point. The specific implementing of the operation is the same as that described above. If the set of uplink subframes contained in the first uplink/downlink subframe configuration is a subset of the set of uplink subframes contained in the second uplink/downlink subframe configuration, the operation may be omitted.

Subsequently, during the last transmission period before the reconfiguration point, if a feedback operation for the uplink HARQ process is performed before the reconfiguration point, a feedback time sequence of the first uplink/downlink subframe configuration may be adopted; and if a feedback and retransmission operation for the upper HARQ process is performed after the reconfiguration point, a feedback and retransmission time sequence of the second uplink/downlink subframe configuration may be adopted.

In addition, during the last transmission period before the reconfiguration point, scheduling of new uplink data to be transmitted in the second configuration period after the reconfiguration point may be stopped.

In other words, scheduling of new data in the new configuration period is not started in the previous period. Specifically, during the last transmission period of the previous configuration period, when receiving a scheduling request (SR) for new data sent from the UE via the PUCCH, the base station determines whether uplink data to be example scheduled need to be transmitted in the new configuration period in case of sending an uplink scheduling signaling to the UE. If the uplink data to be scheduled need to be transmitted in the new configuration period, sending of the uplink scheduling signaling is stopped temporarily until a new configuration period starts, and an uplink scheduling signaling is sent to the UE via the PDCCH in the new configuration period. If the uplink data to be scheduled do not need to be transmitted in the new configuration period, uplink scheduling is performed normally.

Retransmitted data and new data scheduling after the reconfiguration point may be performed based on a retransmission and scheduling time sequence in the new period configuration.

In a retransmission operation before the reconfiguration point, for a downlink subframe for which an NACK feedback is performed, an uplink scheduling time sequence needs to be defined for the downlink subframe if no uplink scheduling time sequence exists in the new period configuration. In this case, the following table 7 lists all the cases in which UL grant needs to be redefined.

The UCI may specifically include: channel quality indication (CQI) information for sending current channel information measured by the user, which may provide import reference for the downlink modulation encoding format and resource scheduling of the base station and so on; precoding matrix indicator (PMT) and rank indication (RI) information for providing basis for selecting a precoding matrix and the number of mapping layers by the base station in case of sending MIMO; and reference signal receiving power/quality (RSRP/RSRQ) for supporting functions for example switching the user and managing the wireless resource.

These control information may be reported periodically or aperiodically, and the control information is generally transmitted via the PUCCH, and may also be transmitted with uplink data together via the PUSCH. In case of periodic reporting, a reporting period for the control information may be preset, and then the UE sends information in a predetermined uplink subframe based on the reporting period. The reporting period of the periodic reporting in the TDD system is determined by the base station based on the parameters such as the channel quality condition, the current sending mode and the uplink/downlink configuration and so on, and is informed to the UE in advance. The aperiodic reporting is based on a triggering mechanism, and the base station will inform the UE via a downlink control signaling if aperiodic control information need to be reported by the UE. The UE reports the aperiodic control information based on the rule in the protocol after receiving the notification.

For example, if the UE receives an uplink DCI format or random access response authorization information in a subframe n, the UE will report aperiodic CQI information in a

TABLE 7 newly defined retransmission UL grant time sequences

| configuration case (previous period/new period) | newly increased scheduling instructions (downlink PDCCH/uplink scheduling subframe) |
| --- | --- |
| configuration #0/configuration #2 | downlink subframe 6/uplink subframe 2 |
| configuration #0/configuration #3 | downlink subframe 6/uplink subframe 2 |
| configuration #0/configuration #4 | downlink subframe 6/uplink subframe 2 |
| configuration #0/configuration #5 | downlink subframe 6/uplink subframe 2 |
| configuration #0/configuration #6 | downlink subframe 6/uplink subframe 2 |
| configuration #1/configuration #0 | downlink subframe 9/uplink subframe 3 |
| configuration #1/configuration #2 | downlink subframe 6/uplink subframe 2 |
| configuration #1/configuration #3 | downlink subframe 6/uplink subframe 2 |
| configuration #1/configuration #4 | downlink subframe 6/uplink subframe 2 |
| configuration #1/configuration #5 | downlink subframe 6/uplink subframe 2 |
| configuration #2/configuration #0 | downlink subframe 8/uplink subframe 2 |
| configuration #2/configuration #1 | downlink subframe 8/uplink subframe 2 |
| configuration #2/configuration #6 | downlink subframe 8/uplink subframe 2 |
| configuration #3/configuration #0 | downlink subframe 8/uplink subframe 2 |
| configuration #3/configuration #0 | downlink subframe 9/uplink subframe 3 |
| configuration #3/configuration #1 | downlink subframe 8/uplink subframe 2 |
| configuration #3/configuration #6 | downlink subframe 8/uplink subframe 2 |
| configuration #4/configuration #0 | downlink subframe 8/uplink subframe 2 |
| configuration #4/configuration #0 | downlink subframe 9/uplink subframe 3 |
| configuration #4/configuration #1 | downlink subframe 8/uplink subframe 2 |
| configuration #4/configuration #6 | downlink subframe 8/uplink subframe 2 |
| configuration #5/configuration #0 | downlink subframe 8/uplink subframe 2 |
| configuration #5/configuration #1 | downlink subframe 8/uplink subframe 2 |
| configuration #5/configuration #6 | downlink subframe 8/uplink subframe 2 |
| configuration #6 configuration #0 | downlink subframe 9/uplink subframe 3 |
| configuration #6/configuration #2 | downlink subframe 6/uplink subframe 2 |
| configuration #6/configuration #3 | downlink subframe 6/uplink subframe 2 |
| configuration #6/configuration #4 | downlink subframe 6/uplink subframe 2 |
| configuration #6/configuration #5 | downlink subframe 6/uplink subframe 2 |

In the LIE system, the UE will send uplink control information (UCI) to the base station to feed back a channel condition, a precoding format, a MIMO sending mode, a data receiving condition and a new data request and so on.

subframe (n+k). For the configuration #1 to configuration #6, values of k are shown in table 1. For the configuration #0, values of k relate to values of UL index in the uplink DCI format:

If an upper bit of UL INDEX in the DCI 0/4 is set as 1, values of k are looked up in table 1;

If a lower bit of UL INDEX in the DCI 0/4 is set as 1, k=7;

If the upper bit and the lower bit of UL INDEX in the DCI 0/4 each are set as 1, values of k are looked up in table 1.

If the uplink/downlink configuration is changed, time sequences also change, and an error occurs for reporting of uplink control information before and after the reconfiguration point, hence it needs to be corrected.

The influence on a periodic reporting time sequence of an uplink control signaling due to a dynamic TDD system relates to uplink/downlink reconfiguration time of the system and a reporting period of a control signaling. The shorter the reconfiguration time and the reporting period are, the greater the influence on the reporting time sequence is.

For the base station, during the last transmission period before the reconfiguration point, the base station needs to readjust the reporting period of the periodic reporting based on a configuration of the new period and inform the UE via the downlink control channel. If the base station receives no uplink control signaling at a predetermined position, the base station performs the modulation encoding and a resource scheduling selection based on the previous values.

For the UE, when the UE receives a period adjusting instruction sent by the base station and if a subframe at the predetermined reporting position becomes a downlink subframe near the reconfiguration point, the UE discards uplink control information measured this time and reports an uplink control signaling based on a new period.

Generally, a time sequence solution referred to by the aperiodic reporting mechanism of the uplink control signaling is substantially the same as UL grant in the uplink HARQ time sequence solution, and needs to be changed correspondingly in a dynamic TDD system.

For the legacy UE, according to the solution described above, no data is transmitted before the reconfiguration point. Hence, even if the UE reports no uplink control information, there will be no great influence on the resource distribution and transmission of the system. Hence, no uplink control information is reported by the legacy UE during the last transmission period before the reconfiguration point.

For the R12 UE, when the UE receives the aperiodic reporting instruction sent by the base station, the new aperiodic reporting time sequence will refer to the changed uplink HARQ time sequence UL grant solution, and it is reported based on the first case, the second case and the third case described above. The specific solutions are not described here.

According to the embodiments of the present disclosure, there is provided the method for reporting an uplink HARQ time sequence, a process and a CQI aperiodically in the LTE dynamic uplink/downlink configuration system of a TDD universal mobile telecommunications system (UMTS), which can achieve flexible service self-adaptability for a dynamic uplink/downlink configuration in a cell, coordinate an HARQ time sequence, ensure a throughput and reduce a transmission delay. The present disclosure may be applicable for a homogeneous or heterogeneous communication network in a TDD mode.

According to the HARQ time sequence processing and HARQ process number processing disclosed by the present disclosure, the legacy UE can have backward compatibility, and the R12 UE can have good resource utilization and low transmission delay.

Figure 14:
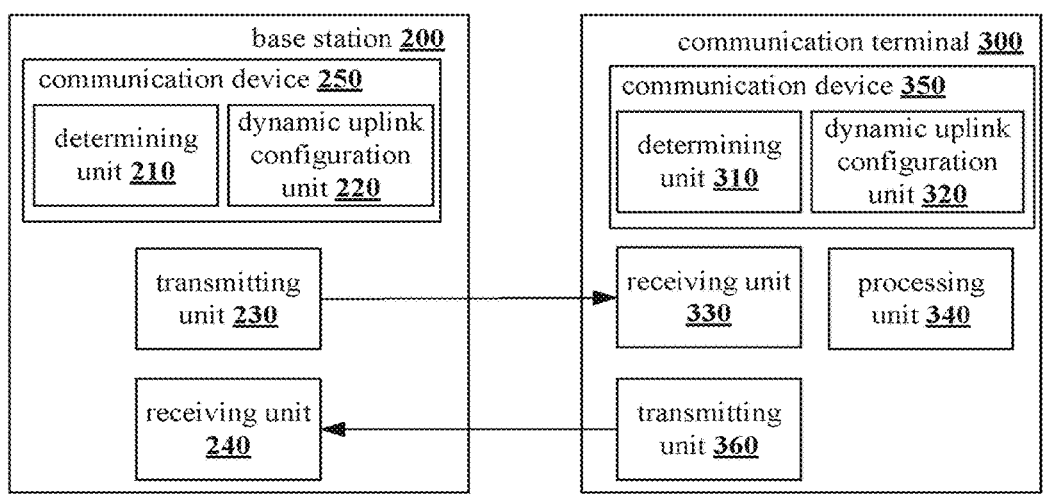
FIG. 14 shows a block diagram of a wireless communication system according to an embodiment of the present disclosure.

Hereinafter a wireless communication system according to an embodiment of the present disclosure is described in conjunction with FIG. 14. As shown in FIG. 14, the wireless communication system 100 according to the embodiment of the present disclosure includes a base station 200 and a communication terminal 300.

The base station 200 may include a communication device 250, a transmitting unit 230 and a receiving unit 240. The communication device 250 may further include a determining unit 210 and a dynamic uplink configuration unit 220.

The determining 210 may be configured to determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point.

The dynamic uplink configuration unit 220 may be configured to perform a dynamic uplink configuration based on the reconfiguration information, so that during a last transmission period before the reconfiguration point, an uplink scheduling time sequence of the second uplink/downlink subframe configuration is adopted for a time sequence of uplink data.

According to the embodiment of the present disclosure, the uplink data here may be an uplink HARQ.

According to the embodiment of the present disclosure, a set of uplink subframes contained in the first uplink/downlink subframe configuration may be a subset of a set of uplink subframes contained in the second uplink/downlink subframe configuration. In this case, the dynamic uplink configuration unit may further perform a dynamic uplink configuration based on the reconfiguration information, so that during the last transmission period before the reconfiguration point, a feedback and retransmission time sequence of the second uplink/downlink subframe configuration is adopted for the time sequence of the uplink data.

According to the embodiment of the present disclosure, the set of uplink subframes contained in the first uplink/downlink subframe configuration may be not a subset of the set of uplink subframes contained in the second uplink/downlink subframe configuration. In this case, the communication device 25 may further include a starting point-in-time setting unit (not shown in FIG. 14). The starting point-in-time setting unit may be configured to set a starting point-in-time for scheduling control in a first configuration period before the reconfiguration point, to perform scheduling control on an uplink HARQ process in a period of time between the starting point-in-time for scheduling control and the reconfiguration point, such that only the uplink HARQ process existing in the second uplink/downlink subframe configuration is remained during the last transmission period before the reconfiguration point.

According to the embodiment of the present disclosure, the period of time between the starting point-in-time for scheduling control and the reconfiguration point may be no less than three times of the maximum RTT time.

According to the embodiment of the present disclosure, the dynamic uplink configuration unit may further perform a dynamic uplink configuration based on the reconfiguration information, so that during the period of time between the starting point-in-time for scheduling control and the reconfiguration point, new data is transmitted in the remained uplink HARQ process only; and if the remained uplink HARQ process has been occupied, no new data is scheduled for transmission.

According to the embodiment of the present disclosure, the dynamic uplink configuration unit may further perform a dynamic uplink configuration based on the reconfiguration information, so that during the last transmission period before the reconfiguration point, a feedback time sequence of the first uplink/downlink subframe configuration is adopted if a feedback operation for the uplink HARQ process is performed before the reconfiguration point.

According to the embodiment of the present disclosure, the dynamic uplink configuration unit may further perform a dynamic uplink configuration based on the reconfiguration information, so that during the last transmission period before the reconfiguration point, a feedback and retransmission time sequence of the second uplink/downlink subframe configuration is adopted if a feedback and retransmission operation for the uplink HARQ process is performed after the reconfiguration point.

According to the embodiment of the present disclosure, the dynamic uplink configuration unit may further perform a dynamic uplink configuration based on the reconfiguration information, so that if an NACK feedback for the uplink HARQ process is performed before the reconfiguration point and a retransmission operation for the uplink HARQ process is performed after the reconfiguration point, and no uplink scheduling time sequence exists in the second uplink/downlink configuration for a downlink subframe for which the NACK feedback is performed, uplink scheduling is redefined to schedule the retransmitted uplink HARQ process into an uplink subframe of the second uplink/downlink subframe configuration.

According to the embodiment of the present disclosure, the uplink data here may be uplink control information which is reported aperiodically.

According to the embodiment of the present disclosure, alternatively, the dynamic uplink configuration unit 220 may also perform a dynamic uplink configuration based on the reconfiguration information, so that transmission of uplink data is stopped during the last transmission period before the reconfiguration point.

According to the embodiment of the present disclosure, it may be operated by taking the reconfiguration point as a boundary without considering a relationship between the set of uplink subframes contained in the first uplink/downlink subframe configuration and the set of uplink subframes contained in the second uplink/downlink subframe configuration. In this case, the communication device 250 may include a determining unit 210 and a scheduling control unit (not shown in FIG. 14). The scheduling control unit may be configured to perform scheduling control on an uplink HARQ process during a predetermined period of time before the reconfiguration point, such that only the uplink HARQ process existing in the second uplink/downlink subframe configuration is remained during the last transmission period before the reconfiguration point. In this case, the communication device 250 may further include a dynamic uplink configuration unit 220. In this case, the dynamic uplink configuration unit 220 may be configured to perform a dynamic uplink configuration based on the reconfiguration information, so that during the last transmission period before the reconfiguration point, a feedback time sequence of the first uplink/downlink subframe configuration is adopted if a feedback operation for the uplink HARQ process is performed before the reconfiguration point; and a feedback and retransmission time sequence of the second uplink/downlink subframe configuration is adopted if a feedback and retransmission operation for the uplink HARQ process is performed after the reconfiguration point. In addition, the scheduling control unit may further stop scheduling of new uplink data to be transmitted in the second configuration period after the reconfiguration point, during the last transmission period before the reconfiguration point.

The transmitting unit 230 may be configured to send a signaling to the communication terminal 300 to inform the communication terminal 300 of reconfiguration information. In addition, the transmitting unit 230 may further transmit uplink scheduling information or feedback information to the communication terminal 300 based on the dynamic uplink configuration.

The receiving unit 240 may be configured to receive the uplink data sent by the communication terminal 300 based on the dynamic uplink configuration.

The communication terminal 300 may include a communication device 350, a receiving unit 330, a transmitting unit 360 and a processing unit 340. The communication device 350 may further include a determining unit 310 and a dynamic uplink configuration unit 320. The communication device 350 and the determining unit 310 and the dynamic uplink configuration unit 320 included therein may respectively correspond to the communication device 250 included in the base station 250 and the determining unit 210 and the dynamic uplink configuration unit 220 included in the communication device 250 functionally. The receiving unit 330 may receive the signaling sent from the transmitting unit 230 to obtain the reconfiguration information for determination by the determining unit 310, and may receive uplink scheduling information or feedback information transmitted by the transmitting unit 230 based on the dynamic uplink configuration performed by the dynamic uplink configuration unit 320. The processing unit 340 may decode the uplink scheduling information or feedback information received by the receiving unit 330 based on the dynamic uplink configuration performed by the dynamic uplink configuration unit 320. The processing unit 340 may perform the HARQ process number processing described above, which is not described here. The transmitting unit 360 may send uplink data to the receiving unit 240 based on the dynamic uplink configuration performed by the dynamic uplink configuration unit 320 and a decoding result from the processing unit 340.

Figure 15:
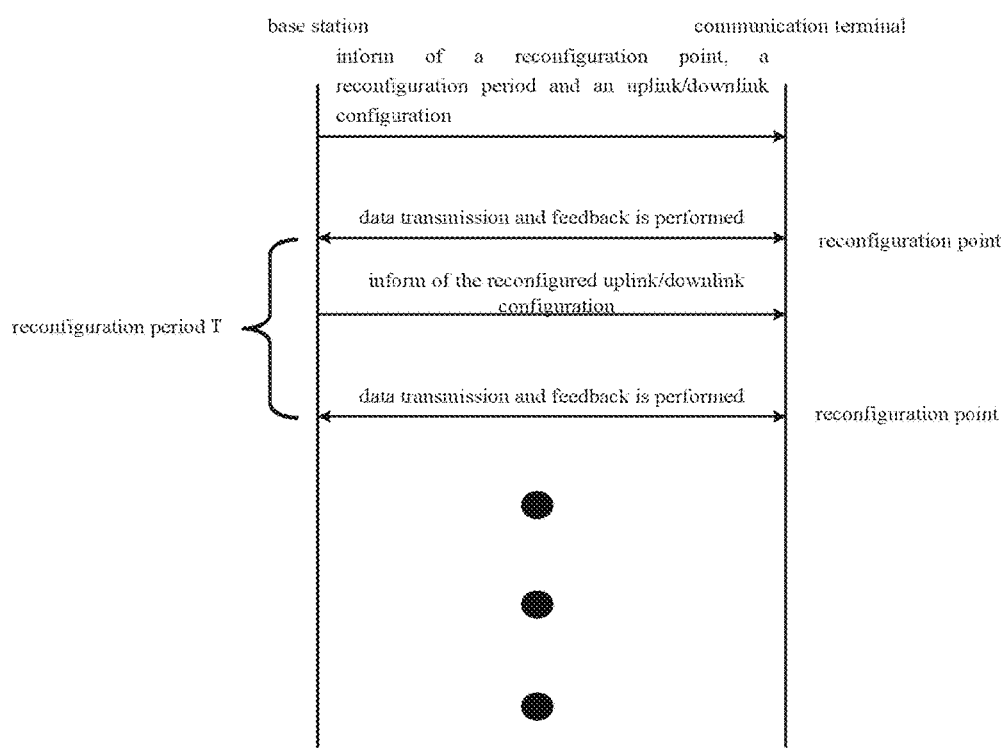
FIG. 15 shows a time sequence diagram of a periodic reconfiguration for an uplink HARQ process performed between a base station and a communication terminal.

FIG. 15 shows a time sequence diagram of a periodic reconfiguration performed on an uplink HARQ process between a base station and a communication terminal. As shown in FIG. 15, in case of a periodic reconfiguration, the base station informs the communication terminal of reconfiguration information including a reconfiguration point, a reconfiguration period and an uplink/downlink configuration in advance. Subsequently, data transmission and feedback is performed between the base station and the communication terminal. If the reconfiguration point is reached, the base station and the communication terminal may perform a dynamic uplink/downlink configuration based on the uplink/downlink configuration mode informed in advance, and data transmission and feedback is performed between the base station and the communication terminal based on a new uplink/downlink configuration. Subsequently, before a next reconfiguration point is reached, the base station may inform the communication terminal of the reconfigured uplink/downlink configuration. Since the reconfiguration point and the reconfiguration period are fixed in case of the periodic reconfiguration, it is not necessary to inform the reconfiguration point and the reconfiguration period again. When a new reconfiguration point is reached, the base station and the communication terminal may perform a dynamic uplink/downlink configuration based on the reconfigured uplink/downlink configuration mode, and data transmission and feedback is performed between the base station and the communication terminal based on the reconfigured uplink/downlink configuration.

Figure 16:
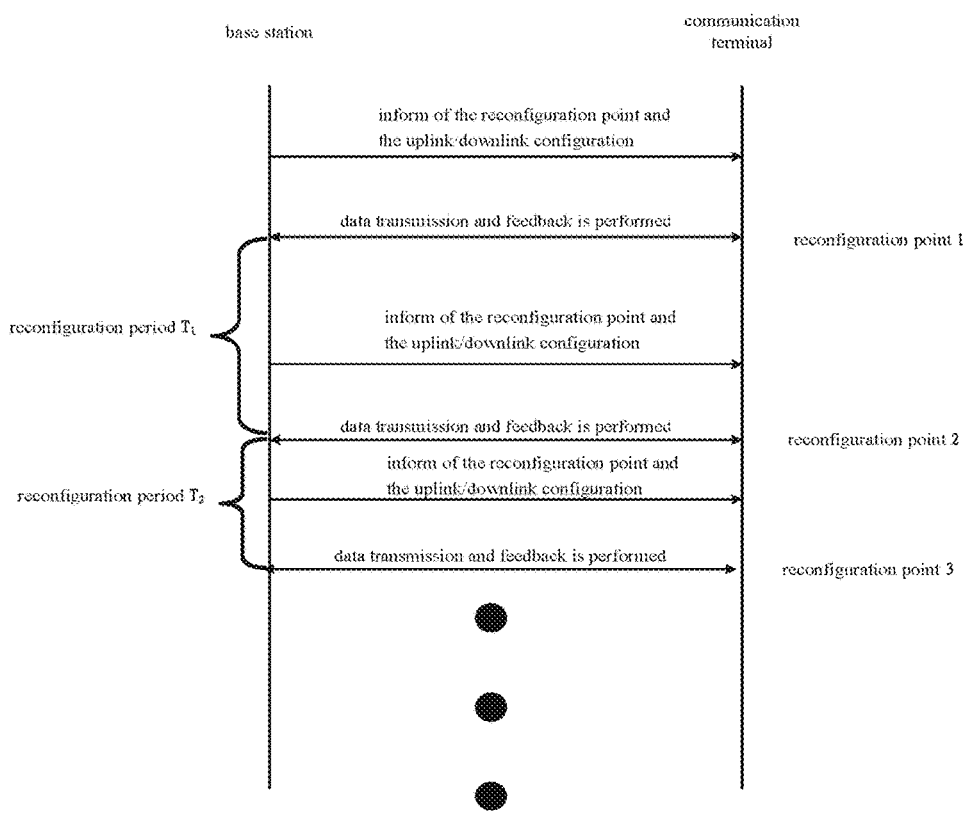
FIG. 16 shows a time sequence diagram of an aperiodic reconfiguration for an uplink HARQ process performed between a base station and a communication terminal.

FIG. 16 shows a time sequence diagram of an aperiodic reconfiguration performed on an uplink HARQ process between a base station and a communication terminal. As shown in FIG. 16, in case of the aperiodic reconfiguration, the base station informs the communication terminal of reconfiguration information including a reconfiguration point and an uplink/downlink reconfiguration before a reconfiguration point 1. When the reconfiguration point 1 is reached, the base station and the communication terminal may perform a dynamic uplink/downlink configuration based on the informed uplink/downlink configuration mode, and data transmission and feedback is performed between the base station and the communication terminal based on the informed uplink/downlink configuration during a reconfiguration period $T_1$. Subsequently, the base station may inform the communication terminal of a reconfiguration point 2 and an uplink/downlink configuration of a next reconfiguration period, i.e., a reconfiguration period $T_2$, during the reconfiguration period $T_1$. Since the reconfiguration point and the reconfiguration period are not fixed in case of the aperiodic reconfiguration, a new reconfiguration point needs to be informed. When the reconfiguration point 2 is reached, the base station and the communication terminal may perform a dynamic uplink/downlink configuration based on the informed new uplink/downlink configuration mode, and data transmission and feedback is performed between the base station and the communication terminal based on the informed new uplink/downlink configuration during the reconfiguration period $T_2$.

The base station may inform the user terminal of reconfiguration information including the reconfiguration point (the reconfiguration period) and the uplink/downlink configuration by adopting a physical (PHY) layer signaling, a media access control (MAC) layer signaling or a radio resource control (RRC) layer signaling or updating the system information. The updating of the system information may further include: reusing system information block (SIB) update in R8 or adopting an earthquake tsunami warning system (ETWS) in R10, etc. A minimum reconfiguration period supported by these methods for supporting reconfiguration ranges from several milliseconds to several hundred milliseconds. The method for supporting a short period uplink/downlink reconfiguration may also be applied to a long period reconfiguration, as long as the configuration does not change during several short periods.

The various specific implementations of the respective units above of the wireless communication system according to the embodiments of the present disclosure have been described in detail previously, and therefore the explanations thereof will not be repeated herein.

Apparently, respective operating processes of the method for performing a dynamic uplink configuration in a wireless communication system above according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the present disclosure can also be implemented by connecting to a corresponding web site on the Internet through a computer, downloading and installing the computer executable program according to the present disclosure into the computer, and then executing the program.

Figure 17:
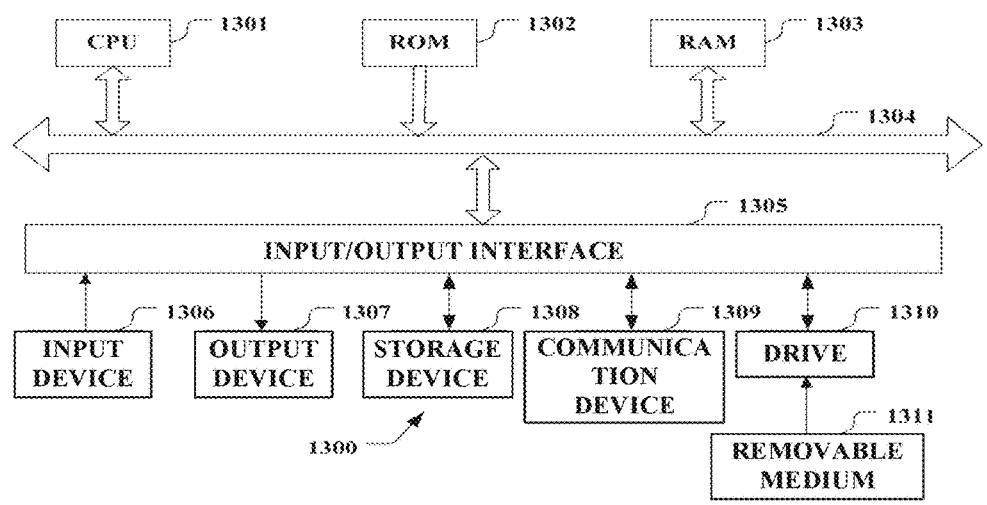
FIG. 17 is a block diagram illustrating an exemplary structure of a general-purpose personal computer on which the method for performing a dynamic uplink configuration in a wireless communication system according to embodiments of the present disclosure can be implemented.

FIG. 17 is a block diagram illustrating an exemplary structure of a general-purpose personal computer on which the method for performing a dynamic uplink configuration in a wireless communication system according to the embodiments of the present disclosure can be implemented.

As shown in FIG. 17, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 may also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

If the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 17 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiments of the present disclosure have been described in detail in combination with the drawings above, it should be understood that, the embodiments described above are only used to explain the present disclosure and is not constructed as the limitation to the present disclosure. For those skilled in the art, various modification and alternation can be made to the above embodiments without departing from the essential and scope of the present disclosure. Therefore, the scope of the present disclosure is only defined by the appended claims and the equivalents thereof.

The invention claimed is:

1. A communication device, comprising processing circuitry, the processing circuitry being configured to:
   determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and
   perform a dynamic uplink configuration based on the reconfiguration information, so that during a last transmission period before the reconfiguration point, for a time sequence of uplink data, an uplink scheduling time sequence of a reference uplink/downlink subframe configuration is adopted, wherein the reference uplink/downlink subframe configuration comprises the second uplink/downlink subframe configuration, and
   wherein the first uplink/downlink subframe configuration is different from the reference uplink/downlink subframe configuration.

2. The communication device according to claim 1, wherein the uplink data is an uplink hybrid automatic repeat request (HARQ).

3. The communication device according to claim 2, wherein a set of uplink subframes contained in the first uplink/downlink subframe configuration is a subset of a set of uplink subframes contained in the second uplink/downlink subframe configuration, and
   the processing circuitry is further configured to perform the dynamic uplink configuration based on the reconfiguration information, so that during the last transmission period before the reconfiguration point, for the time sequence of the uplink data, a feedback and retransmission time sequence of the second uplink/downlink subframe configuration is adopted.

4. The communication device according to claim 2, wherein a set of uplink subframes contained in the first uplink/downlink subframe configuration is not a subset of a set of uplink subframes contained in the second uplink/downlink subframe configuration, and
   the processing circuitry is further configured to set a starting point-in-time for scheduling control in the first configuration period before the reconfiguration point, to perform scheduling control on an uplink HARQ process during a period of time between the starting point-in-time for scheduling control and the reconfiguration point, such that only the uplink HARQ process existing in the second uplink/downlink subframe configuration remains during the last transmission period before the reconfiguration point.

5. The communication device according to claim 4, wherein the period of time between the starting point-in-time for scheduling control and the reconfiguration point is no less than three times of a maximum RTT time.

6. The communication device according to claim 4, wherein the processing circuitry is further configured to perform the dynamic uplink configuration based on the reconfiguration information, so that during the period of time between the starting point-in-time for scheduling control and the reconfiguration point, Previously Presented data is transmitted in the remained uplink HARQ process only, and no Previously Presented data is scheduled for transmission if the remained uplink HARQ process has been occupied.

7. The communication device according to claim 4, wherein the processing circuitry is further configured to perform the dynamic uplink configuration based on the reconfiguration information, so that during the last transmission period before the reconfiguration point, a feedback time sequence of the first uplink/downlink subframe configuration is adopted if a feedback operation for the uplink HARQ process is performed before the reconfiguration point.

8. The communication device according to claim 7, wherein the processing circuitry is further configured to perform the dynamic uplink configuration based on the reconfiguration information, so that if a NACK feedback for the uplink HARQ process is performed before the reconfiguration point and a retransmission operation for the uplink HARQ process is performed after the reconfiguration point, and no uplink scheduling time sequence exists in the second uplink/downlink subframe configuration for a downlink subframe for which the NACK feedback is performed, an uplink scheduling is redefined to schedule the retransmission operation for the uplink HARQ process into the uplink subframe of the second uplink/downlink subframe configuration.

9. The communication device according to claim 4, wherein the processing circuitry is further configured to perform the dynamic uplink configuration based on the reconfiguration information, so that during the last transmission period before the reconfiguration point, a feedback and retransmission time sequence of the second uplink/downlink subframe configuration is adopted if a feedback and retransmission operation for the uplink HARQ process is performed after the reconfiguration point.

10. The communication device according to claim 1, wherein the uplink data is uplink control information which is reported aperiodically.

11. The communication device according to claim 1, wherein the communication device is a base station and the processing circuitry is further configured to send a signal to a communication terminal to inform the communication terminal of reconfiguration information.

12. The communication device according to claim 11, wherein the processing circuitry is further configured to:
   transmit uplink scheduling information or feedback information to the communication terminal based on the dynamic uplink configuration; and
   receive uplink data sent by the communication terminal based on the dynamic uplink configuration.

13. The communication device according to claim 1, wherein the communication device is a communication terminal and the processing circuitry is further configured to:
   receive a signal sent by a base station to obtain reconfiguration information for determination, and to receive uplink scheduling information or feedback information transmitted by the base station based on the dynamic uplink configuration;

decode the uplink scheduling information or feedback information based on the dynamic uplink configuration; and send uplink data to the base station based on the dynamic uplink configuration and a decoding result from the processing circuitry.

14. A communication device, comprising processing circuitry, the processing circuitry being configured to:

determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and perform a dynamic uplink configuration based on the reconfiguration information, so that transmission of uplink data is stopped during a last transmission period before the reconfiguration point, wherein the uplink data comprises uplink control information.

15. A communication device, comprising processing circuitry, the processing circuitry being configured to:

determine reconfiguration information containing a reconfiguration point, so that a first uplink/downlink subframe configuration is adopted in a first configuration period before the reconfiguration point and a second uplink/downlink subframe configuration is adopted in a second configuration period after the reconfiguration point; and perform scheduling control on an uplink hybrid automatic repeat request (HARQ) process during a predetermined period of time before the reconfiguration point, such that only the uplink HARQ process existing in the second uplink/downlink subframe configuration remains during a last transmission period before the reconfiguration point, wherein the processing circuitry is further configured to stop, during the last transmission period before the reconfiguration point, scheduling of uplink data to be transmitted in the second configuration period after the reconfiguration point.

16. The communication device according to claim 15, wherein the processing circuitry is further configured to:

perform a dynamic uplink configuration based on the reconfiguration information, so that during the last transmission period before the reconfiguration point, a feedback time sequence of the first uplink/downlink subframe configuration is adopted if a feedback operation for the uplink HARQ process is performed before the reconfiguration point, and a feedback and retransmission time sequence of the second uplink/downlink subframe configuration is adopted if a feedback and retransmission operation for the uplink HARQ process is performed after the reconfiguration point.

* * * * *